Patented Aug. 11, 1953

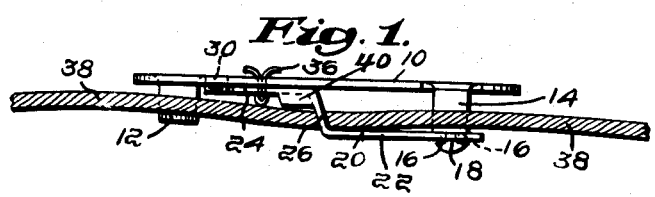
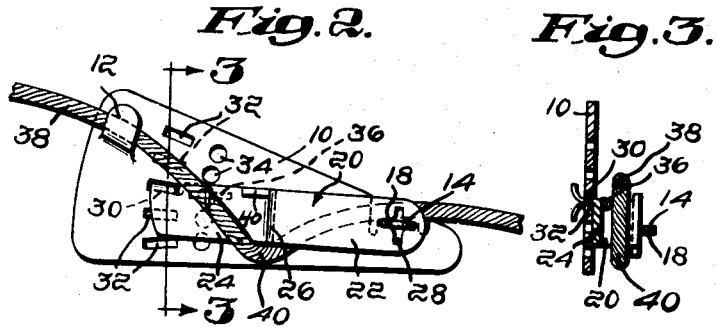
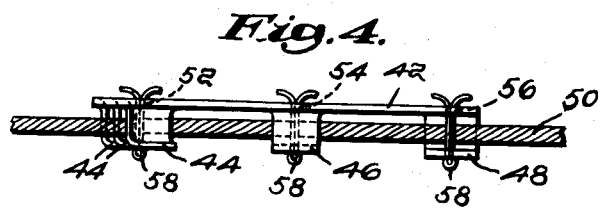
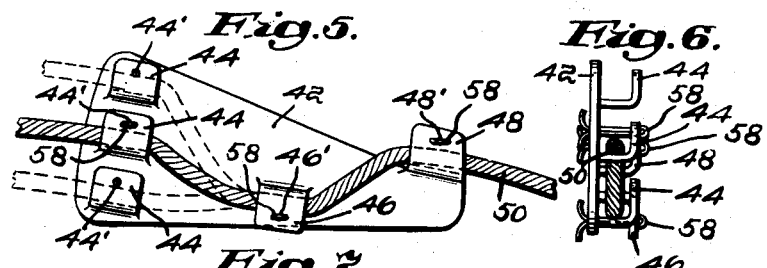
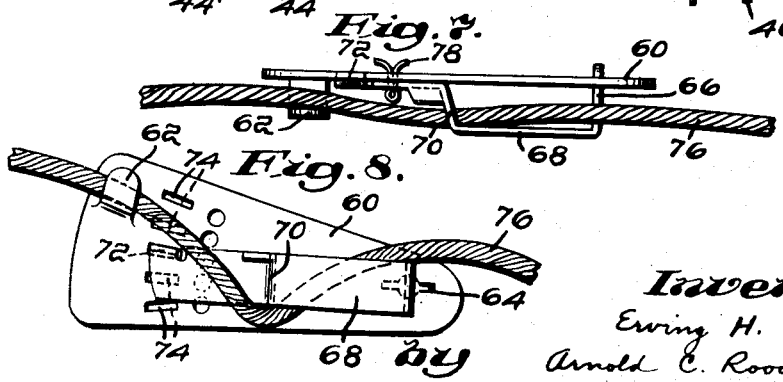

2,648,109

UNITED STATES PATENT OFFICE 2,648,109

CABLE ADJUSTING DEVICE

Erving H. Cline, Stoughton, Mass.

Application August 11, 1950, Serial No. 178,901

4 Claims. (Cl. 24—71.1)

1

The present invention relates generally to cable adjusting devices and more particularly to cable adjusting or slack reducing devices for automotive brake cables.

Cables for brakes of automotive vehicles are usually formed of stranded wire, although rope, single strand wire or the like may be used. During use such cables become slack, due in part to stretching of the cable, wire or the like, and in part to wear of the parts to which the cable or wire is connected. Any appreciable slack in the cable or wire prevents application of proper braking tension through the cable or wire.

Since it is both difficult and time consuming to shorten or change such cable or wire, a simple and effective device for taking up or reducing slack in such wires or cables which may be quickly and easily applied thereto without danger of injury to the mechanic is desirable. This invention provides a slack reducing device comprising a base having cable engaging means thereon which forms a slack reducing loop and maintains such loop when braking tension is applied to the brake cable. The base is preferably in the form of a rigid flat plate having spaced cable engaging members fixed thereto and located at opposite ends of said plate. The plate is further provided with cable engaging means which is arranged to form a slack reducing loop in the cable. This loop forming means is preferably located intermediate the ends of the plate and is offset from the spaced cable engaging members. The loop forming means may, preferably, be pivoted and may be locked in any one of several loop forming positions, thus providing a relatively wide range of slack-reducing adjustment. Alternatively, several fixed cable engaging members may be mounted on the plate and the cable passed over or about selected members, depending upon the length of slack reducing loop which is to be formed, thus providing for a wide range of adjustment.

Further advantages and details of construction will become apparent from the specification when read with reference to the accompanying drawings, in which:

Figure 1 is a plan view of one modification of the present invention;

Fig. 2 is a view in side elevation of the embodiment shown in Fig. 1;

Fig. 3 is a view in vertical section taken along the line 3—3 of Fig. 2;

Fig. 4 is a plan view similar to Fig. 1 but showing another modification of the invention;

Fig. 5 is a view in side elevation of the construction shown in Fig. 4;

2

Fig. 6 is an end view of the construction shown in Fig. 4;

Fig. 7 is a plan view of a still further modification of the invention; and

Fig. 8 is a view in side elevation of the construction shown in Fig. 7.

The construction shown in Figs. 1, 2 and 3 includes a rigid base plate 10 which is flat and is generally triangular in shape. The plate 10 adjacent to one end is provided with a cable engaging member or hook 12 which may be punched out of the plate 10 or it may be a separate member welded or otherwise secured to the plate 10. The other end of the plate 10 is provided with an upstanding flat post 14 which is formed integrally with the base plate 10. The post 14 at its upper end is provided with a pair of aligned slots 16 forming a neck 18 and which are arranged to receive the end portion of a loop forming lever 20. As shown most clearly in Fig. 2, the lever 20 is provided with a pair of parallel offset sections 22, 24, connected by a cable engaging section 26. The portion or section 22 is provided with a transversely extending slot 28 having an enlarged central portion sufficiently wide to permit the lever 20 to turn freely about the neck 18. The other offset portion 24 is provided with a downturned tab 30 which is arranged to enter any one of a plurality of elongated slots 32 formed in the base plate 10 adjacent to the cable engaging hook 12. There is also provided adjacent to the slots 32 a series of holes 34 which are arranged to receive a suitable cotter pin 36 for locking the lever 20 is selected loop forming position.

As shown best in Fig. 2, the brake cable 38 engages the hook 12 and the post 14. The cable is also engaged by the cable engaging section 26 of the loop forming lever 20 which forms the slack reducing loop 40 in the cable. The lever 20 is swung about its pivot in a counterclockwise direction, as viewed in Fig. 2, until the slack is taken out of the cable 28, the tab 30 is then dropped into the nearest slot 32 and a cotter pin 36 is inserted through a hole 38 in the lever 20 and through an underlying hole 34 in the base plate 10. The legs of the cotter pin 36 are then spread to lock the parts together in loop forming position. In order to facilitate the formation of the slack reducing loop, the lever 20 is provided with an upstanding lip 40 which may be grasped with a pair of pliers for moving the lever 20 into a loop forming position and tighten the brake cable as much as possible. The lever 20 thus forms a convenient means for forming slack reducing loops of varying lengths to effectively take up varying amounts of slack in the brake cable.

The modification shown in Figs. 4, 5 and 6 is provided with a base plate 42 having a plurality of cable engaging hooks 44, 46, 48 fixed thereto by welding or other suitable means. The cable 50 passes over the hook 48, under the hook 46 and over one of the hooks 44 dependent upon the amount of slack in the cable 50. If only a small amount of slack needs to be taken up, the cable may pass the lowermost hook 44 while for greater amounts the hook may be passed over either the middle or the top hook 44. Each of the hooks 44, 46, 48 is drilled to form a cotter pin receiving hole 44', 46', 48', and the base plate 42 is provided with underlying holes 52, 54, 56 through which suitable cotter pins 58 may be passed to lock the cable 50 in loop forming or slack reducing position.

A further modification is illustrated in Figs. 7 and 8. The construction comprises a slack reducing device similar to the one shown in Figs. 1 to 3 and includes a substantially triangular flat steel plate 60 having a hook 62 welded thereto adjacent to one end. The other end of the plate 60 is provided with a keyhole slot 64 arranged to receive the free end of an arm 66 formed at one end of a slack reducing or adjusting lever 68 having an intermediate offset loop reducing portion 70. The free end portion of the lever 68 is provided with a tab 72 arranged selectively to enter slots 74 in the plate 60. The brake cable 76 passes over the arm 66 and the hook 62 and under the offset portion 70 of the adjusting lever 68. Thus, when the lever 68 is turned in counter-clockwise direction, as viewed in Fig. 8, a slack reducing loop is formed between the arm 66 and the hook 62. When all of the slack is removed from the cable 76, the tab 72 is dropped into the nearest slot 74 to maintain the lever 68 in loop forming position. In order to maintain the lever 68 in position, the lever 68 is provided with a hole in which a cotter pin 78 is inserted which in turn enters one of a series of holes 80 formed in the plate 60. When the legs of the cotter pin 28 are spread apart, the lever 68 is locked against accidental displacement.

The three embodiments described above may quickly and easily be applied to a brake cable of an automobile or truck with a pair of pliers or screwdriver. The slack cable is placed over the hooks on the base plate and the slack reducing loop is then formed either by operation of the lever 20 (Figs. 1 to 3) lever 68 (Figs. 7 and 8) or by placing the cable over one of the hooks 44 (Figs. 4 to 6). The pliers or screwdriver may be used to assist in placing the slack reducing loop over the proper hook 44 or to rotate the lever 20 or 68 sufficiently to permit the tab 22 or 72 to enter the proper slot in the base plate.

Although the present invention has been described with particular reference to reducing slack in automotive brake cables, it is to be understood that it is not limited thereto but is intended also to be used for reducing slack in wires, ropes, cables and the like used for other purposes.

Having thus described my invention what I claim as new and desire to secure by Letters Patent of the United States is:

1. A slack reducer for cables, comprising a rigid supporting plate, a cable engaging hook fixed to said plate adjacent to one end thereof, an upstanding cable engaging abutment fixed at its lower end to said plate adjacent to the other end thereof, a loop forming lever pivoted to the upper end of said abutment and having a portion arranged to engage said cable to form a slack-reducing loop therein between said upstanding abutment and said cable-engaging portion when said lever is rotated about its pivot, and a locking member arranged to maintain said lever in any one of a plurality of loop forming positions.

2. A slack reducer for cables comprising a rigid base, a cable engaging member fixed to said base adjacent to one end thereof, and a lever having an end portion pivoted to said base adjacent to the other end thereof, said end portion forming a cable engaging member, said lever having an intermediate loop forming portion arranged upon rotation of said lever to form between said fixed cable-engaging member and said cable-engaging end portion of said lever predetermined slack-reducing loops.

3. A slack reducer for cables comprising a rigid base, a cable engaging member fixed to said base adjacent to one end thereof, a lever having an end portion pivoted to said base adjacent to the other end thereof, said end portion forming a cable engaging member, said lever having an intermediate loop forming portion arranged upon rotation of said lever to form between said fixed cable-engaging members and said cable-engaging end portion of said lever predetermined slack-reducing loops, and means for locking said lever in predetermined loop forming position.

4. A cable adjusting device comprising, in combination, a rigid base plate, a cable engaging hook fixed to said base adjacent to one end thereof, and a lever having a portion pivoted to said base adjacent to the other end thereof, said lever having a portion spaced from said base at its pivoted end and another portion disposed adjacent to said base at its outer end, the intermediate portion of said lever connecting said spaced and adjacent portions being arranged to engage a cable to form between said cable-engaging hook and said pivoted portion of said lever a slack-reducing loop therein, said base having a series of slots therein adjacent to said hook and equidistant from the pivoted end of the lever, said lever extending downwardly at its outer end for engagement in one of said slots.

ERVING H. CLINE.

References Cited in the file of this patent

UNITED STATES PATENTS

| Number | Name | Date |
| --- | --- | --- |
| 432,429 | McClaughry | July 15, 1890 |
| 1,183,636 | Garrabrant | May 16, 1916 |
| 1,423,211 | Gushwa | July 18, 1922 |
| 2,049,074 | Mott | July 28, 1936 |
| 2,220,366 | Fly | Nov. 5, 1940 |
| 2,449,031 | Woodson | Sept. 7, 1948 |